(12) United States Patent
Kato

(10) Patent No.: US 7,636,113 B2
(45) Date of Patent: Dec. 22, 2009

(54) NOISE REDUCTION APPARATUS FOR DIGITAL CAMERA

(75) Inventor: Tetsuaki Kato, Saitama (JP)

(73) Assignee: Hoya Corporation, Tokyo (JP)

( * ) Notice: Subject to any disclaimer, the term of this patent is extended or adjusted under 35 U.S.C. 154(b) by 639 days.

(21) Appl. No.: 10/928,163

(22) Filed: Aug. 30, 2004

(65) Prior Publication Data
US 2005/0046713 A1 Mar. 3, 2005

(30) Foreign Application Priority Data
Sep. 1, 2003 (JP) ............................ P2003-308457

(51) Int. Cl.
H04N 9/64 (2006.01)
H04N 5/217 (2006.01)
(52) U.S. Cl. ...................................... 348/243; 348/241
(58) Field of Classification Search ................. 348/241, 348/243, 251, 294, 296, 297
See application file for complete search history.

(56) References Cited

U.S. PATENT DOCUMENTS

| | | | | |
|---|---|---|---|---|
| 6,084,634 A * | 7/2000 | Inagaki et al. | ............... | 348/294 |
| 6,710,807 B1 * | 3/2004 | Yamagishi | ................. | 348/362 |
| 6,798,456 B1 | 9/2004 | Sato | | |
| 7,023,479 B2 * | 4/2006 | Hiramatsu et al. | ........... | 348/243 |
| 7,136,100 B1 * | 11/2006 | Kato et al. | ................... | 348/241 |
| 2002/0196353 A1 * | 12/2002 | Nakahira et al. | ............ | 348/243 |
| 2003/0128285 A1 * | 7/2003 | Itoh | ........................... | 348/246 |
| 2004/0032490 A1 * | 2/2004 | Uchida | ........................ | 348/96 |
| 2004/0095487 A1 * | 5/2004 | Sato | ........................... | 348/243 |

FOREIGN PATENT DOCUMENTS

| | | | |
|---|---|---|---|
| JP | 2000-209506 | * | 7/2000 |
| JP | 2001-78083 | | 3/2001 |
| JP | 2001-78084 | | 3/2001 |

OTHER PUBLICATIONS

English Language Abstract of JP 2000-209506.
U.S. Appl. No. 10/928,187 to Kato, which was filed on Aug. 30, 2004.

* cited by examiner

*Primary Examiner*—Sinh Tran
*Assistant Examiner*—Christopher K Peterson
(74) *Attorney, Agent, or Firm*—Greenblum & Bernstein, P.L.C.

(57) ABSTRACT

A noise reduction apparatus of a digital camera which uses an imaging device for imaging a photographic subject, carries out a specified number of dark exposure operations, to obtain the same specified number of dark output values for each picture element of the imaging device, in which the photographic subject is imaged, under the condition where the imaging device is shaded, after a normal exposure operation in which the photographic subject is imaged. The apparatus calculates a representative value for each dark exposure operation, based on the dark output values. The apparatus calculates a ratio based on the representative values. The apparatus calculates noise components caused by the dark current in each picture element of the imaging device in the normal exposure operation on the basis of the ratio. The apparatus reduces the noise components from respective output values of each picture element, produced in the normal exposure operation.

11 Claims, 5 Drawing Sheets

NOISE REDUCTION APPARATUS FOR DIGITAL CAMERA

BACKGROUND OF THE INVENTION

1. Field of the Invention

The present invention relates to a noise reduction apparatus for a digital camera, and in particular to noise reduction in long time exposure operations such as night-view imaging and astrophotography imaging.

2. Description of the Related Art

When a long time exposure operation is carried out in a digital camera which has an imaging device such as a CCD, there is a problem that a dark output by a certain picture element of the imaging device, becomes bigger than that of other picture elements due to the influence of the dispersion of dark current in each picture element on the imaging device, so that the dark output by a certain picture element turns out as a bright point in a dark area on the image.

Even for an optical black output, which is obtained when a partly shaded CCD is used, the dark current component is not able to be cut and removed, so that an image having generally increased brightness and damaged image quality is obtained.

Japanese unexamined patent publication (KOKAI) No. 2000-209506 discloses a noise reduction apparatus that images normally (normal exposure operation), stores the time length of an exposure operation, immediately exposes again while shading the CCD (the dark exposure operation) for the same length of time as the time length of the normal exposure operation, and reduces noise components by taking away a dark output obtained by the dark exposure operation from a normal output obtained by the normal exposure operation, for every picture element. In other words canceling the dark output of each picture element in the normal exposure operation by using the dark output of each picture element in the dark exposure operation, is the usual method of reducing the fixed pattern noise occurring due to dispersion of dark current in each picture element.

However, the above-discussed conventional noise reduction method does not consider the rise in temperature of the CCD associated with the time length of the dark exposure operation which is carried out immediately after the normal exposure operation. Dark current occurs due to heat, and the temperature of a CCD goes up according to the time length of the exposure operation.

Accordingly, an error results between the dark current component Im, obtained from the normal exposure operation, and the dark current component Id, obtained from the dark exposure operation, for every picture element. That is to say, the temperature of the CCD further goes up in the dark exposure operation, because the CCD has been used continuously from the normal exposure operation, so that the dark current in the dark exposure operation is more than the dark current in the normal exposure operation, corresponding to the rise in temperature of the CCD (Im<Id). The images obtained by taking away the dark current component Id, obtained from the dark exposure operation, from the normal output obtained by the normal exposure operation, create a condition where the dark output is pulled too much, accordingly the color balance of the image collapses and the brightness decreases (under exposure).

SUMMARY OF THE INVENTION

Therefore, an object of the present invention is to provide a noise reduction apparatus for a digital camera which uses an imaging device such as a CCD, that can reduce noise in a long time exposure image, caused by the dispersion of dark current in each picture element of the CCD. The noise-reduction apparatus must consider the temperature rise of the CCD associated with continuous use.

According to the present invention, a noise reduction apparatus for a digital camera which has an imaging device for imaging a photographic subject, comprises a dark exposure processor, a representative value calculating processor, a ratio calculating processor, a noise component calculating processor, and a noise reducing processor.

The dark exposure processor carries out a specified number of dark exposure operations to obtain the same specified number of dark output values for each picture element of the imaging device, in which the photographic subject is imaged, under the condition where the imaging device is shaded, after a normal exposure operation in which the photographic subject is imaged.

The representative value calculating processor calculates a representative value for each dark exposure operation, based on the dark output values.

The ratio calculating processor calculates a ratio of each representative value.

The noise component calculating processor calculates noise components caused by the dark current in each picture element of the imaging device in the normal exposure operation, on the basis of the ratio.

The noise reducing processor reduces the noise components from respective output values of each picture element in the normal exposure operation.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
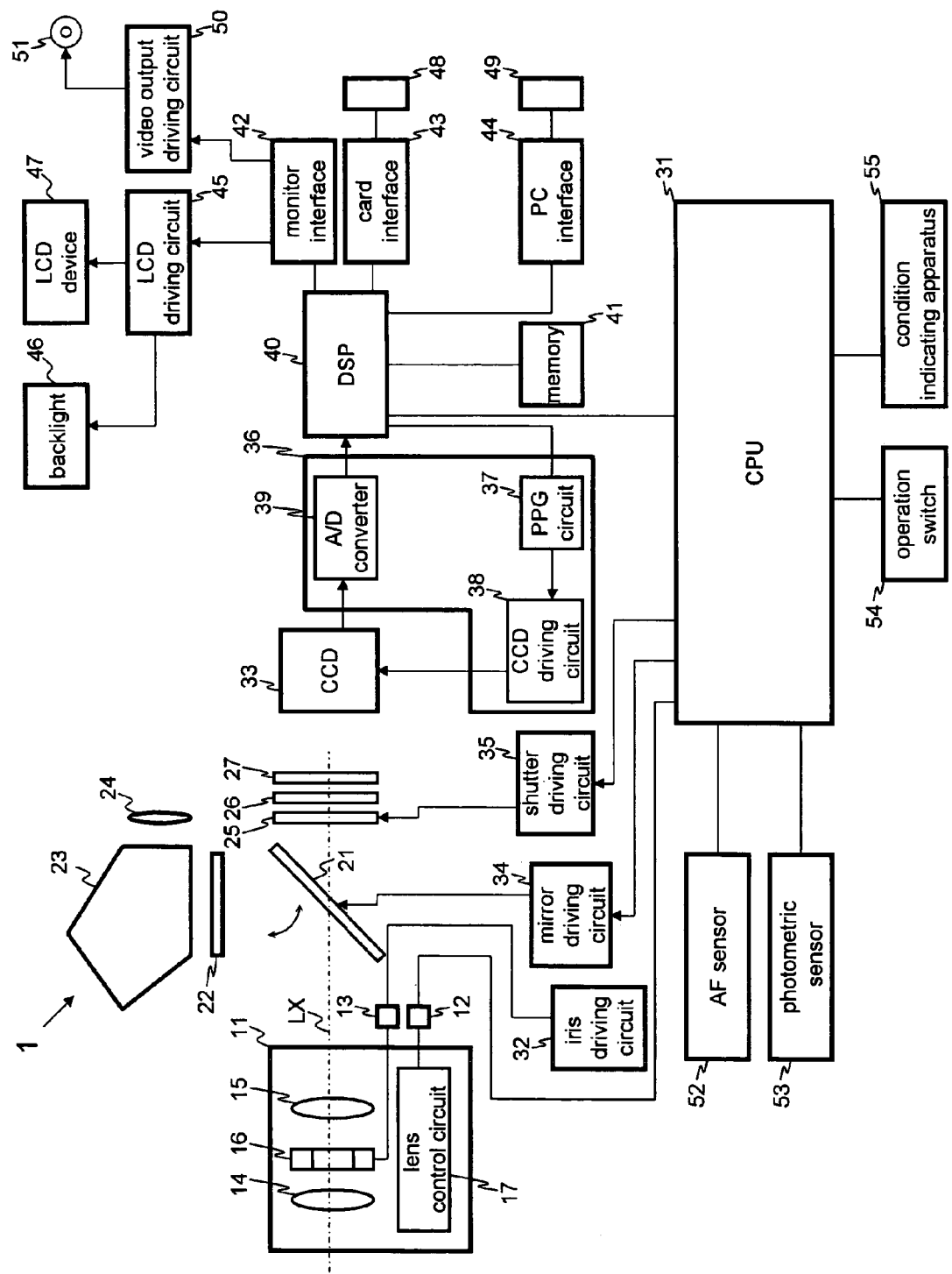
FIG. 1 is a block diagram of the digital camera of this embodiment.

The present invention is described below with reference to the embodiments shown in the drawings. FIG. 1 shows a block diagram of a digital camera of this embodiment.

The digital camera 1 which is a single-lens reflex camera, having mount pins 12 and 13, a CPU 31, and an iris driving circuit 32. An interchangeable lens 11 is connected with electric circuits of the digital camera 1, through the mount pins 12 and 13. A lens barrel of the interchangeable lens 11 has a front lens 14, a rear lens 15, an iris 16, and a lens control circuit 17. The iris 16 is set between the front lens 14 and the rear lens 15. Focusing is carried out by moving the front and rear lenses 14 and 15 along an optical axis LX and is controlled by the lens control circuit 17. The lens control circuit 17 is controlled by control signals which are transmitted from the CPU 31 through the mount pin 12. The iris 16 is controlled by control signals which are transmitted from the iris driving circuit 32 through the mount pin 13, in such a way that a degree of opening of the iris 16 is adjusted. The iris driving circuit 32 is controlled by the CPU 31.

The digital camera 1 has a quick return mirror 21 in line with the optical axis LX of the front and rear lenses 14 and 15. The quick return mirror 21 can be changed between an inclined down position which is depicted, and a level up position which is above the inclined position.

The digital camera 1 has a focusing glass 22 above the quick return mirror 21 in the level condition, a pentagonal prism 23 above the focusing glass 22, and an ocular lens 24 of a view finder at the rear of the pentagonal prism 23 (the opposite side of the interchangeable lens 11).

The digital camera 1 has a shutter 25 at the rear of the quick return mirror 21, an infrared cut off filter 26 and an optical low-pass filter 27 at the rear of the shutter 25. A CCD (an imaging device) 33 is located at the rear of the optical low-pass filter 27. Accordingly, the quick return mirror 21, the shutter 25, the infrared cut off filter 26, the optical low-pass filter 27, and the CCD 33 are in line with the optical axis LX of the front and rear lenses 14 and 15.

The digital camera 1 has a mirror driving circuit 34 and a shutter driving circuit 35. The rotation of the quick return mirror 21 is driven by the mirror driving circuit 34. The opening and closing action of the shutter 25 is driven by the shutter driving circuit 35. Further, the mirror driving circuit 34 and the shutter driving circuit 35 are controlled by the CPU 31.

The quick return mirror 21 is usually in the inclined position, so that the light which enters the changeable lens 11 is guided to the pentagonal prism 23 by the quick return mirror 21. At this time, the shutter 25 is closed, so that the light path toward the CCD 33 from the changeable lens 11 is blocked by the shutter 25.

During the imaging process, the quick return mirror 21 is rotated upward by the mirror control circuit 34, so that the quick return mirror 21 is leveled. The shutter 25 is opened by the shutter driving circuit 35 corresponding to the rotation of the quick return mirror 21, so that the light which passes through the changeable lens 11 is guided to the light-receiving surface of the CCD 33. An image obtained through the front and rear lenses 14 and 15, is formed on the light-receiving surface of the CCD 33, so that imaging signals corresponding to the image are formed by the CCD 33.

The digital camera 1 has a DSP (Digital Signal Processor) 40, an AF (Auto Focus) sensor 52, a photometric sensor 53, an operation switch 54, and a setting indicating apparatus 55. The lens control circuit 17, the iris driving circuit 32, the DSP 40, the AF sensor 52, the photometric sensor 53, the operation switch 54, and the setting indicating apparatus 55 are connected to the CPU 31, and are controlled by the CPU 31, so that the CPU 31 controls the action of the changeable lens 11 which is mounted on the digital camera 1, and also the digital camera 1, generally.

In this embodiment, a dark exposure operation is carried out in addition to the normal exposure operation when the digital camera 1 images a photographic subject for a long time exposure operation which is defined as an exposure operation that has an exposure time over a specified time (a first and second standard time). In this embodiment, a normal exposure operation is defined as an operation where the digital camera images the photographic subject normally, and a dark exposure operation is defined as an operation where the digital camera obtains an image while shading the CCD 33.

The first standard time is 60 seconds, and the second standard time is 1 second.

The dark exposure operation is carried out one time or two times depending on the time length of the normal exposure operation (the normal exposure time Tv), and the first and second standard times.

The DSP 40 is a control circuit for controlling the exposure operation of the CCD 33 and for processing the image data obtained by the exposure operation. Therefore, the DSP 40 runs the image processes for noise reduction from the data obtained from the normal exposure operation. The noise reduction processes are carried out on the basis of the image data etc. obtained during the normal exposure operation and during the dark exposure operation, both of which are controlled by the CPU 31.

The digital camera 1 has a memory 41 which has sufficient capacity to store the digital image data corresponding to images of the photographic subject in the normal exposure and the first and second dark exposure operations, and is connected to the DSP 40. The memory 41 stores a normal exposure time Tv, and first and second standard times which are used for comparison with the length of the normal exposure time Tv.

The digital camera 1 has a PPG (Programmable Pulse Generator or Pulse Pattern Generator) circuit 37, a CCD driving circuit 38, and an A/D (Analogue/Digital) converter 39. The PPG circuit 37 is connected with the DSP 40, so that the PPG circuit 37 generates various pulse signals according to the DSP 40. The CCD driving circuit 38 is driven on the basis of these various pulse signals, so that the action of the CCD 33 is controlled by the CCD driving circuit 38. That is, the imaging signals which are read out from the CCD 33, are converted to digital signals by the A/D converter 39, and are subjected to specified image processes by the DSP 40.

An AFE (Analogue Front End) 36 is composed of the PPG circuit 37, the CCD driving circuit 38, and the A/D converter 39. The AFE 36 outputs a vertical synchronous signal Vd to the CCD 33 with a first or a second cycle, every stated period. The start of the exposure operation, the termination of the exposure operation, and the reading of the data obtained in the exposure operation are carried out according to the vertical synchronous signal Vd and the drive pulse for transferring electric charge.

The first cycle is shorter than the second cycle. The first cycle is 5 ms. The second cycle is 168.3 ms which is equal to the time needed for the exposure data for one field to be read out.

The vertical synchronous signal Vd is output with the first cycle except during the normal exposure operation, the dark exposure operations, and the reading of the exposure data, because the response speed corresponding to the setting of the AFE 36 etc. should be high, and because the image which is indicated should be changed with proper timing for the through image.

The vertical synchronous signal Vd is output with the second cycle during the normal exposure operation, the dark exposure operations, and the reading of the exposure data.

A noise reduction apparatus relating to the present invention is composed of the CPU 31, the AFE 36, and the DSP 40.

The digital camera 1 has a monitor interface 42, a card interface 43, and a PC interface 44. The monitor interface 42, the card interface 43, and the PC interface 44 are connected to the DSP 40 and are controlled by the DSP 40.

The digital camera 1 has an LCD (Liquid Crystal Display) driving circuit 45, a backlight 46, an LCD device 47, a card connector 48, a PC connector 49, a video output driving circuit 50, and a video output terminal 51.

The monitor interface 42 is connected with the backlight 46 and the LCD device 47 through the LCD driving circuit 45, and is connected with the video output terminal 51 through the video output circuit 50. The LCD driving circuit 45 is controlled on the basis of the image data read out from the memory 41, so that the image corresponding to the image data is indicated on the LCD device 47. The image data is converted to the specified format by the video output driving circuit 50, so that the converted image data is output to external output devices which are not depicted, through the video output terminal 51.

The card interface 43 is connected with the card connector 48, and the PC interface 44 is connected with the PC connector 49. The card connector 48 can be fixed to the IC memory card which can store image data etc. and is not depicted. The PC connector 49 can be connected to a personal computer which is not depicted.

The AF sensor 52 and the photometric sensor 53 are connected with the CPU 31. The AF sensor 52 measures the focus adjustment condition of the front and rear lenses 14 and 15. The photometric sensor 53 carries out the photometry to automatically decide the degree of opening of the iris 16 during the normal exposure operation and the electric charge accumulation time (the time length of the normal exposure operation).

The operation switch 54 and the setting indicating apparatus 55 are connected with the CPU 31. The operation switch 54 has a photometric switch and a release switch etc. The digital camera 1 has a release button which is not depicted. The photometric switch is turned to the on state when the release button is half way depressed. When the photometric switch is in the on state, the photometry is carried out by the photometric sensor 53. The shutter release switch is tuned to the on state when the release button is fully depressed. And, the shutter 25 is opened and closed, so that the CCD 33 is exposed, and the CCD 33 generates imaging signals corresponding to the image of the photographic subject. The setting indicating apparatus 55 has an LCD device which indicates the various settings of the digital camera 1.

Figure 2:
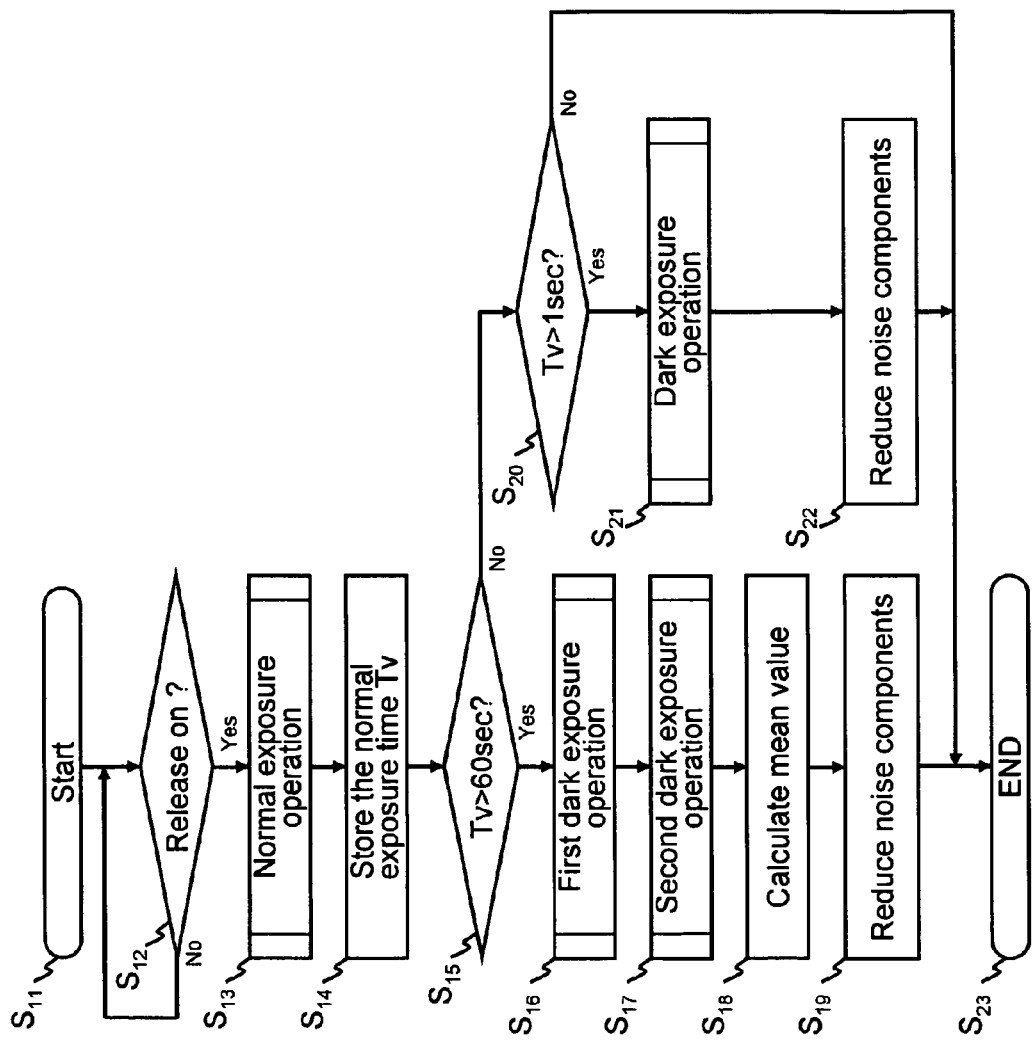
FIG. 2 is a flowchart showing the normal exposure operation and the dark exposure operation.
Figure 3:
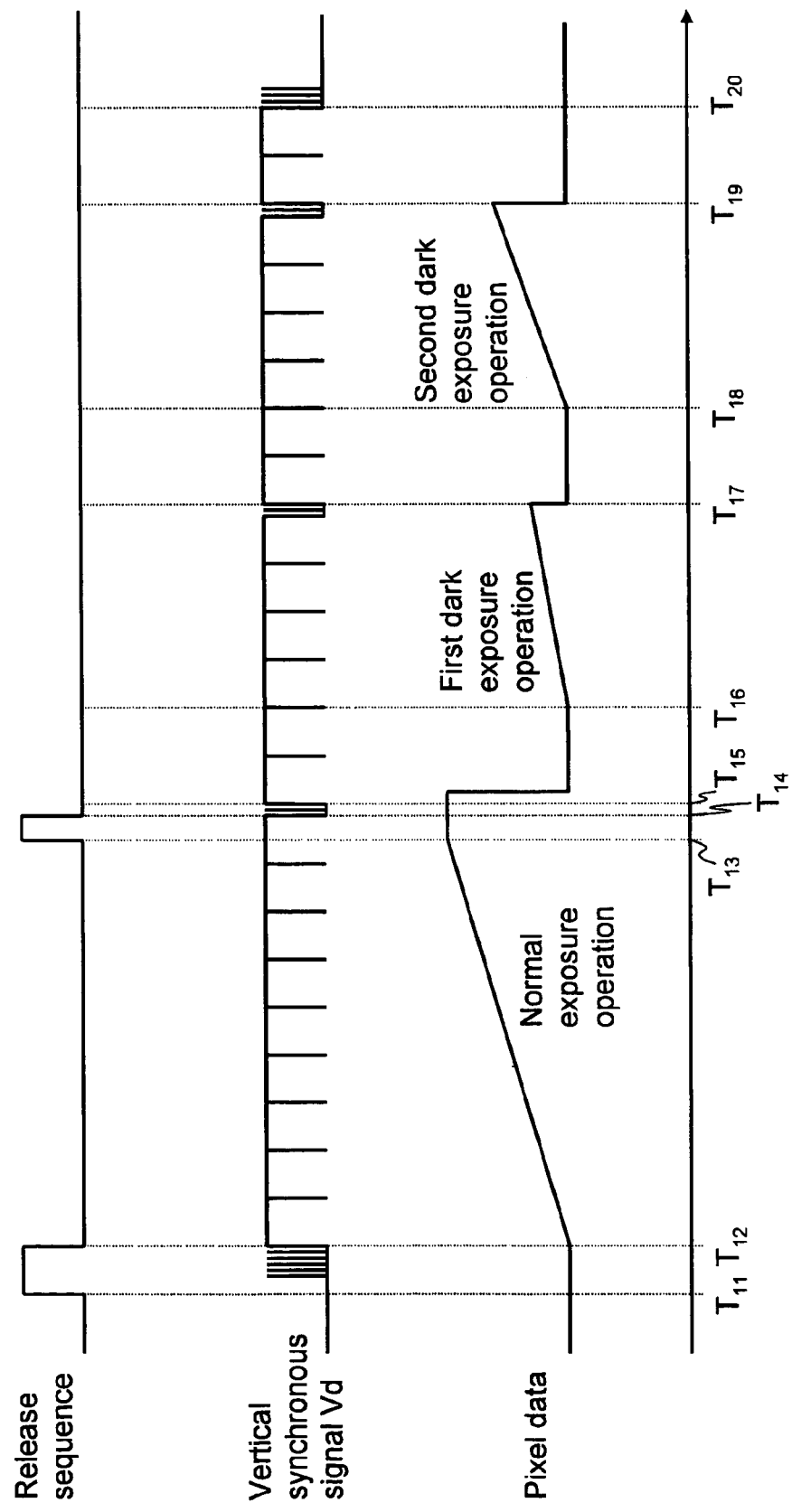
FIG. 3 is a timing chart showing the normal exposure operation and the first and second dark exposure operations.
Figure 4:
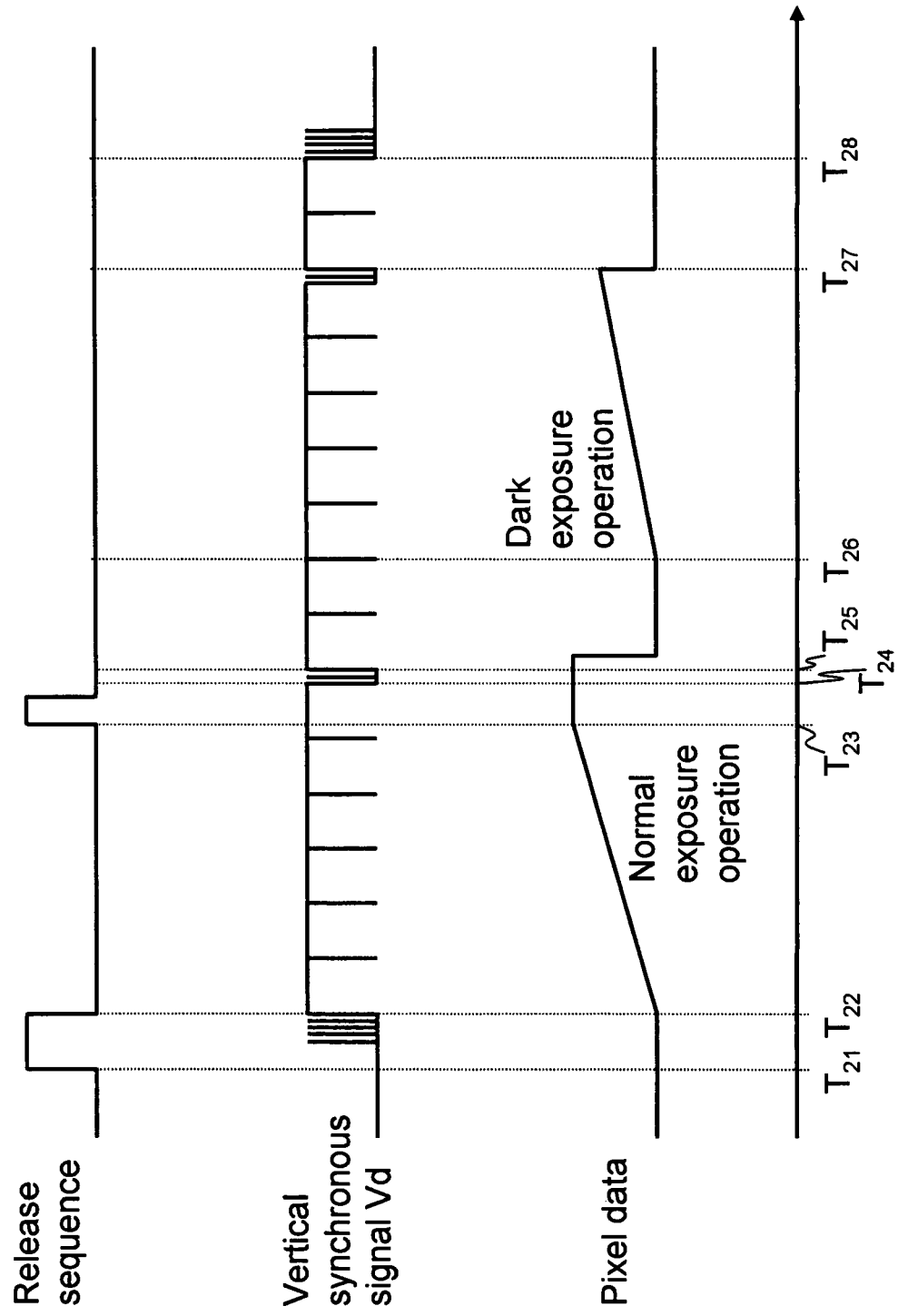
FIG. 4 is a timing chart showing the normal exposure operation and the dark exposure operation.

Next, the flow of the normal exposure operation and the dark exposure operations is explained (see FIGS. 2 to 4). FIG. 3 shows a timing chart for the case where the normal exposure time Tv is longer than the first standard time. FIG. 4 shows a timing chart for the case where the normal exposure time Tv is longer than the second standard time and is shorter than or equal to the first standard time.

The horizontal axes of FIGS. 3 and 4 represent time. FIGS. 3 and 4 show the timings where the vertical synchronous signal Vd is output and where pixel data accumulated by the CCD 33 during a normal exposure operation and a dark exposure operation, is read in, corresponding to the pulse input (the release sequence) at the start and termination of the long time exposure operation.

The flowchart in FIG. 2 shows the action of the DSP 40 controlled by the CPU 31 after the power switch (not depicted) is turned on.

The flow starts in step $S_{11}$. It is judged whether the release switch is in the on state by the operator, in step $S_{12}$. When the release switch is in the on state ($T_{11}$ in FIG. 3, and $T_{21}$ in FIG. 4), the normal exposure operation is started ($T_{12}$ in FIG. 3, and $T_{22}$ in FIG. 4), in step $S_{13}$.

The time length of the normal exposure operation (the normal exposure time Tv) which is the period from $T_{12}$ to $T_{13}$ in FIG. 3 is manually set by the operator or is automatically set by the photometry before the release switch is turned to the on state. When the operator manually sets the normal exposure time Tv with the bulb exposure, the length of time during the on state of the release switch is controlled by the operator.

Immediately after the normal exposure operation is terminated ($T_{13}$ in FIG. 3, and $T_{23}$ in FIG. 4), the operation mode of the AFE 36 is changed from a first mode for the exposure operation, to a second mode for the reading of the data obtained in the exposure operation, from the vertical synchronous signal output point ($T_{14}$ in FIG. 3, and $T_{24}$ in FIG. 4).

The first mode for the exposure operation of the AFE 36 is the operation mode where electric charge signals, which occur in the imaging device, due to light striking the light-receiving surface of the imaging device and forming the electric charge, are accumulated.

The second mode for reading of the data obtained in the exposure operation of the AFE 36 is the operation mode where accumulated electric charge is transferred from a receiving-unit in the imaging device to a transferring-unit in the imaging device; the transferring-unit is driven by the transferring-drive pulse signals (not depicted); and the electric charge from the imaging device is gradually read.

In FIG. 3, the normal exposure time is strictly from point $T_{12}$ to point $T_{14}$, however during the short time from point $T_{13}$ to point $T_{14}$, the exposure operation under the condition of shading of the CCD 33, is carried out, so that the normal exposure time is actually from point $T_{12}$ to point $T_{13}$. Similarly in FIG. 4, the normal exposure time is strictly from point $T_{22}$ to point $T_{24}$, however during the short time from point $T_{23}$ to point $T_{24}$, the exposure operation under the condition of shading of the CCD 33, is carried out, so that the normal exposure time is actually from point $T_{22}$ to point $T_{23}$.

After the operation mode of the AFE 36 is changed to the second mode for reading of the data obtained in the exposure operation ($T_{15}$ in FIG. 3, and $T_{25}$ in FIG. 4), the exposure data of the normal exposure operation is read for every field, or the reading of the electric charge that was accumulated in each picture element of the CCD 33 for every field, is carried out.

In the first field, the exposure data of the normal exposure operation is read in for 168.3 ms from point $T_{15}$ in FIG. 3 or point $T_{25}$ in FIG. 4. In the second field, the exposure data of the normal exposure operation is read in for 168.3 ms from a point which is 168.3 ms passed point $T_{15}$ in FIG. 3 or point $T_{25}$ in FIG. 4.

In the normal exposure operation, accumulation of the electric charge is carried out under the condition that the CCD 33 receives light from the photographic subject, so that the accumulated electric charge is composed of the accumulated electric charge corresponding to the light from the photographic subject, and the accumulated electric charge corresponding to the dark current of the CCD 33. In other words, the accumulated electric charge is the sum of the accumulated electric charge corresponding to the light from the photographic subject, and the accumulated electric charge corresponding to the dark current of the CCD 33.

When the reading in the accumulated electric charges in the first and second fields is terminated ($T_{16}$ in FIG. 3, and $T_{26}$ in FIG. 4), the length of the normal exposure time Tv is stored in the digital camera 1 in step $S_{14}$, so that the dark exposure operation is carried out.

The number of dark exposure operations, and whether or not the dark exposure operation is carried out, are judged according to the length of the normal exposure time Tv. The judgment is carried out according to the first and second standard times which are stored in the memory 41 in advance, and the length of the normal exposure time Tv.

In step $S_{15}$, it is judged whether or not the length of the normal exposure time Tv is longer than the first standard time (60 sec). When the length of the normal exposure time Tv is longer than 60 sec, the dark exposure operation is carried out two times (step $S_{16}$~$S_{19}$ in FIG. 3).

When the length of the normal exposure time Tv is shorter than or equal to 60 sec, it is judged whether or not the length of the normal exposure time Tv is longer than the second standard time (1 sec). When the length of the normal exposure time Tv is longer than 1 sec, the dark exposure operation is carried out one time (step $S_{21}$~$S_{22}$ in FIG. 4).

This is because there is little temperature rise of the CCD 33 associated with the time length of the dark exposure operation, even when using the noise reduction method in the prior art, where the dark output value due to the dark current at the time of the normal exposure operation is calculated from the dark output value due to the dark current in one dark exposure operation, in the case where the normal exposure time is comparatively short, for example from 1 sec to 60 sec.

When the length of the normal exposure time Tv is shorter than or equal to 1 sec, the dark exposure operation is not carried out. This is because a dark current has little influence on the dark output value for a normal exposure time, which is comparatively short, for example below 1 sec.

The case where the dark exposure operation is carried out twice is explained below. In step $S_{16}$, the first dark exposure operation is started ($T_{16}$ in FIG. 3). The first dark exposure operation is terminated ($T_{17}$ in FIG. 3), after only half of the normal exposure time Tv. That is to say, half the distance from point $T_{12}$ to point $T_{13}$ which is the normal exposure time Tv, is equal to the distance and therefore the time from point $T_{16}$ to point $T_{17}$.

After the first dark exposure operation, the exposure data of the first dark exposure operation is read for every field, or the reading of the electric charge that has accumulated in each picture element of the CCD 33 for every field is carried out ($T_{17}$ in FIG. 3).

In the first dark exposure operation, the imaging and thereby the accumulating of the electric charge is carried out under the condition that the CCD 33 does not receive light from the photographic subject, so that the accumulated electric charge is composed of the accumulated electric charge corresponding to the dark current of the CCD 33.

When the reading of the accumulated electric charge for the first and second fields is terminated ($T_{18}$ in FIG. 3), the second dark exposure operation is carried out.

Next, in step $S_{17}$, the second dark exposure operation is started ($T_{18}$ in FIG. 3). The second dark exposure operation is terminated ($T_{19}$ in FIG. 3), after half of the normal exposure time Tv. That is to say, half the distance from point $T_{12}$ to point $T_{13}$ which is the normal exposure time, is equal to the distance and therefore the time from point $T_{18}$ to point $T_{19}$, similar to the first dark exposure operation.

After the second dark exposure operation, the exposure data of the second dark exposure operation is read for every field, or the reading of the electric charge that has accumulated in each picture element of the CCD 33 for every field is carried out ($T_{19}$ in FIG. 3).

In the second dark exposure operation, the imaging and thereby the accumulating of the electric charge is carried out under the condition that the CCD 33 does not receive light from the photographic subject, so that the accumulated electric charge is composed of the accumulated electric charge corresponding to the dark current of the CCD 33, as in the first dark exposure operation.

When the reading of the accumulated electric charges in the first and second fields is terminated ($T_{20}$ in FIG. 3), a mean value, which corresponds to the integration value Sd of the dark current, of the data that is output from each picture element due to the dark current in the normal exposure operation is calculated on the basis of mean values, which respectively correspond to the integration values S2 and S3 of the dark current, of the data that is output from each picture element due to the dark current in the first and second dark exposure operations, in step $S_{18}$.

In step $S_{19}$, an output value which is deducted from the influence of the dark current of each picture element in the normal exposure operation, in other words which is reduced noise components in the normal exposure operation, is calculated on the basis of the calculated mean value. In step $S_{23}$, the flow is terminated. The method in steps $S_{18}$ and $S_{19}$ is described later.

Next, the case where the dark exposure operation is carried out once is explained. After step $S_{20}$, the dark exposure operation is started ($T_{26}$ in FIG. 4), in step $S_{21}$. The dark exposure operation is terminated ($T_{27}$ in FIG. 4), after the normal exposure time Tv. That is to say, the length of time corresponding to the distance between point $T_{22}$ and point $T_{23}$, which is the normal exposure time Tv, is equal to the distance and therefore the time between point $T_{26}$ and point $T_{27}$.

After the dark exposure operation, the exposure data of the dark exposure operation is read for every field, or the reading of the electric charge that has accumulated in each picture element of the CCD 33 for every field, is carried out ($T_{27}$ in FIG. 4).

In the dark exposure operation, the imaging and thereby the accumulating of the electric charge is carried out under the condition that the CCD 33 does not receive light from the photographic subject, so that the accumulated electric charge is composed of the accumulated electric charge corresponding to the dark current of the CCD 33.

When the reading of the accumulated electric charges in the first and second fields is terminated ($T_{28}$ in FIG. 4), an output value which is deducted from the influence of the dark current of each picture element in the normal exposure operation, in other words which is reduced noise components in the normal exposure operation, is calculated, in step $S_{22}$. In step $S_{23}$, the flow is terminated.

The dark output value obtained by using the dark current in the dark exposure operation is regarded as equal with the dark output value obtained by using the dark current in the normal exposure operation, in the calculating method of step $S_{22}$.

When the dark exposure operation is not carried out, the flow is terminated in step $S_{23}$, after step $S_{20}$.

The calculation for reducing the dark output value of the dark current for the normal exposure data in steps $S_{18}$ and $S_{19}$ in the case where the dark exposure operations are carried out twice, is explained.

It can be assumed that the normal exposure operation, the first dark exposure operation, and the second dark exposure operation are continuously carried out. This is because it can be assumed that the normal exposure time ($T_{12}$~$T_{13}$ in FIG. 3), the first dark exposure time ($T_{16}$~$T_{17}$ in FIG. 3), and the second dark exposure time ($T_{18}$~$T_{19}$ in FIG. 3) are sufficiently longer than the time ($T_{17}$~$T_{18}$ in FIG. 3) etc. required to read the accumulated electric charges.

Figure 5:
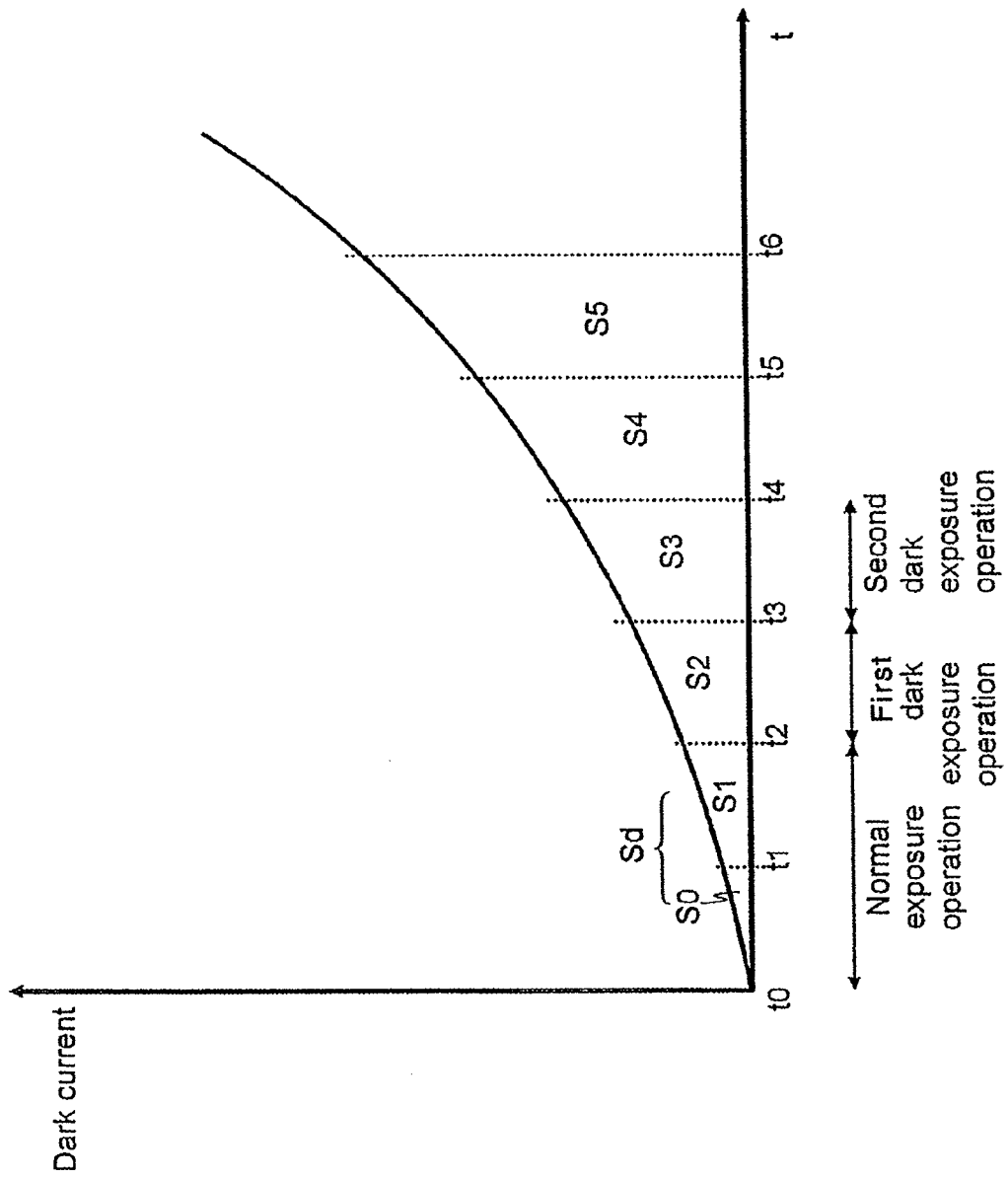
FIG. 5 is a graph showing the change of the dark current over time.

Accordingly, the increase in the dark current corresponding to the rise in temperature of the CCD 33 over time in the case where the normal exposure operation, the first dark exposure operation, and the second dark exposure operation are continuously carried out, is like that shown in FIG. 5. The horizontal axis of FIG. 5 represents time and the vertical axis of FIG. 5 represents the value of the dark current.

The integration value of the dark current for a certain time section corresponds to the mean value of the dark outputs from each picture element of the CCD 33 for that certain time section.

In FIG. 5, the normal exposure time Tv is given by the time between t0 and t2, which is equal to the time between $T_{12}$ and $T_{13}$ in FIG. 3. Similarly, in FIG. 5, the first dark exposure time is given by the time between t2 and t3, which is equal to the time between $T_{16}$ and $T_{17}$ in FIG. 3. Similarly, in FIG. 5, the second dark exposure time is given by the time between t3 and t4, which is equal to the time between $T_{18}$ and $T_{19}$ in FIG. 3.

In FIG. 5, the point where only half of the normal exposure time Tv has passed is defined as t1.

The integration values of the dark current which respectively correspond to the mean values of the dark output values that are output from each picture element of the CCD 33 for the time between t0~t1, t1~t2, t2~t3, t3~t4, t4~t5, and t5~t6, are defined as S0, S1, S2, S3, S4, and S5.

The electric charge corresponding to only the dark current is accumulated in the first and second dark exposure operations. Accordingly, the integration value of the dark current in the first dark exposure operation S2 is obtained on the basis of the output values which are the same as the dark output values and which are output from each picture element of the CCD 33 in the first dark exposure operation. Similarly, the integration value of the dark current in the second dark exposure operation S3 is obtained on the basis of the output values which are the same as the dark output and which are output from each picture element of the CCD 33 in the second dark exposure operation.

However, because the electric charge corresponding to not only the dark current, but also the light from the photographic subject is accumulated in the normal exposure operation, the integration value of the dark current in the normal exposure operation Sd (=S0+S1) can not be directly obtained on the basis of output values which are output from each picture element of the CCD 33 in the normal exposure operation. Accordingly, the integration value Sd needs to be obtained from the integration values S2 and S3.

When the increase curve of the dark current is a linear shape, as shown in FIG. 5, the integration values S0, S1, S2, and S3 have the following relationship (S0<S1<S2<S3):

$$S1 \approx S2 \times (S2 \div S3) \quad (1)$$
$$S0 \approx S1 \times (S1 \div S2)$$
$$= S2 \times (S2 \div S3) \times (S2 \div S3) \quad (2)$$

The integration value Sd has the following relationship on the basis of equations (1) and (2).

$$Sd = S0 + S1 \quad (3)$$
$$\approx S2 \times (S2 \div S3) \times (S2 \div S3) + S2 \times (S2 \div S3)$$
$$= S2 \times \{(S2 \div S3) \times (S2 \div S3) + (S2 \div S3)\}$$

The integration value of the dark current Sd is calculated by multiplying the integration value S2 by a coefficient which is calculated on the basis of the ratio of the integration values S2 and S3. The equation (3) is applied to the calculation of the dark current of each picture element, so that the calculation of the dark current component in each picture element data, that is to be removed, is decided.

The output value of a particular picture element in the normal exposure operation is defined as Pm, similarly the dark output value of the particular picture element in the first dark exposure operation is defined as Pd1. The output value Pm' of the particular picture element for a normal exposure operation, where the dark output by the dark current, or the noise component, has been removed, is given by the following equation.

$$Pm'=Pm-Pd1 \times \{(S2 \div S3) \times (S2 \div S3)+(S2 \div S3)\} \quad (4)$$

If equation (4) is applied to all the picture elements, it becomes possible to calculate the output value for each picture element, where the dark output component (the noise component) of the dark current, in the normal exposure operation, has been removed.

Accordingly, the mean values, which respectively correspond to the integration values S2 and S3, of the dark outputs in the first and second dark exposure operations, are calculated in steps $S_{16}$ and $S_{17}$ in FIG. 2, so that the mean value, which corresponds to the integration value Sd, of the dark outputs in the normal exposure operation, is calculated in step $S_{18}$ in FIG. 2 on the basis of the integration values S2 and S3. Then the output value of each picture element, where the dark output component of the dark current, is removed, is calculated in step $S_{19}$ in FIG. 2.

Furthermore, in this embodiment, it is explained that the integration value of the dark current corresponds to the mean value of the dark output values that are output from each picture element of the CCD 33, however the integration value of the dark current may correspond to the total value of the dark output values that are output from each picture element of the CCD 33.

The mean or total value of the dark output values, for each dark exposure operation, may be determined on the basis of some of the picture elements of all the picture elements of the CCD 33.

For simplicity of calculation, the lengths of the first and second dark exposure times are half of the length of the normal exposure time, for carrying out the calculation of the dark current component and the reduction of the dark output value, however the length of the dark exposure time is not limited to this.

However, if the exposure times were different from the above exposure times, another set of calculation equations whereby the dark output value of the dark current in the normal exposure operation is calculated on the basis of two dark output values of the dark current in the first and second dark exposure operations, would be needed, and the same effect would be obtained.

The number of dark exposure operations is set at two to perform the calculation quickly. However, the number of dark exposure operations may be set to three or more, so that the accuracy of the calculation for the dark output value of the dark current in the normal exposure operation, becomes high, on the basis of the ratios of a plurality of mean values.

Furthermore, the length of the first standard time is not limited to 60 seconds, similarly the length of the second standard time is not limited 1 second.

The digital camera in this embodiment is a single-lens reflex camera, however the digital camera is not limited to this.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2003-308457 (filed on Sep. 1, 2003), which is expressly incorporated herein by reference, in its entirety.

The invention claimed is:

1. A noise reduction apparatus for a digital camera which has an imager for imaging a photographic subject, comprising:
   a dark exposure processor that performs two dark exposure operations including a primary dark exposure operation and a secondary dark exposure operation to obtain corresponding two dark output values for each picture element of the imager, in which the photographic subject is imaged, under a condition where the imager is shaded, after a normal exposure operation in which the photographic subject is imaged;
   a representative value calculating processor that calculates a representative value for the primary dark exposure operation and the secondary dark exposure operation, based on the two dark output values;
   a ratio calculating processor that calculates a ratio of each calculated representative value by dividing the representative value for the primary dark exposure operation by the representative value for the secondary dark exposure operation;
   a noise component calculating processor that calculates noise components caused by a dark current in each said picture element of the imager in said normal exposure operation, on the basis of said ratio; and
   a noise reducing processor that reduces said noise components from respective output values of each said picture element in said normal exposure operation.

2. The noise reduction apparatus according to claim 1, wherein time lengths of the two dark exposure operations are the same.

3. The noise reduction apparatus according to claim 2, wherein the time length of each said dark exposure operation is half of a time length of said normal exposure operation.

4. The noise reduction apparatus according to claim 1, further comprising:
   an exposure time judging processor that judges whether a time length of said normal exposure operation is shorter than or equal to a first standard time which is set in said digital camera;
   wherein said dark exposure processor performs the two dark exposure operations, when it is judged that said time length of said normal exposure operation is longer than said first standard time, by said exposure time judging processor;
   wherein said representative value calculating processor calculates said representative value, when it is judged that said time length of said normal exposure operation is longer than said first standard time, by said exposure time judging processor;
   wherein said ratio calculating processor calculates said ratio, when it is judged that said time length of said normal exposure operation is longer than said first standard time, by said exposure time judging processor;
   wherein said noise component calculating processor calculates said noise components, when it is judged that said time length of said normal exposure operation is longer than said first standard time, by said exposure time judging processor; and
   wherein said noise reducing processor reduces said noise components from respective said output values, when it is judged that said time length of said normal exposure operation is longer than said first standard time, by said exposure time judging processor.

5. The noise reduction apparatus according to claim 4, wherein said dark exposure processor performs said dark exposure operation only once, after said normal exposure operation, for a same length of time as said time length of said normal exposure operation, when it is judged that said time length of said normal exposure operation is shorter than or equal to said first standard time, by said exposure time judging processor; and
   wherein said noise component calculating processor calculates noise components of each picture element of the imager in said normal exposure operation, on the basis of the dark current of each picture element of the imager in said single dark exposure operation, when it is judged that said time length of said normal exposure operation is shorter than or equal to said first standard time, by said exposure time judging processor.

6. The noise reduction apparatus according to claim 5, wherein a length of said first standard time is 60 seconds.

7. The noise reduction apparatus according to claim 5,
   wherein said exposure time judging processor judges whether said time length of said normal exposure operation is shorter than or equal to a second standard time which is shorter than said first standard time, and which is set in said digital camera;
   wherein said dark exposure processor does not carry out said dark exposure, when it is judged that the length of said normal exposure time is shorter than or equal to said second standard time, by said exposure time judging processor;
   wherein said noise component calculating processor does not calculate said noise components in said normal exposure operation, when it is judged that said normal exposure time is shorter than or equal to said second standard time, by said exposure time judging processor; and
   wherein said noise reducing processor does not reduce said noise components in said normal exposure operation from said respective output values of each said picture element in said normal exposure operation, when it is judged that said normal exposure time is shorter than or equal to said second standard time, by said exposure time judging processor.

8. The noise reduction apparatus according to claim 7, wherein a length of said second standard time is 1 second.

9. The noise reduction apparatus according to claim 1, wherein said representative values equal mean values of the two dark output values of at least one picture element of the imager.

10. A method for reducing noise in a digital camera which has an imager for imaging a photographic subject, comprising:
   imaging the photographic subject as a normal exposure operation;
   imaging, when the imager is shaded, two dark exposure operations, including a primary dark exposure operation and a secondary dark exposure operation, to obtain corresponding two dark output values for each picture element of the imager, after said normal exposure operation;
   calculating, for each dark exposure operation, a ratio of a representative value by dividing a first representative value for the primary dark exposure operation by a second representative value for the secondary dark exposure operation, the first and second representative values being calculated on the basis of the two dark output values;
   calculating noise components caused by a dark current of each picture element of the imager in said normal exposure operation on the basis of said calculated ratio; and reducing said noise components in said normal exposure operation from respective output values of each said picture element in said normal exposure operation.

11. A digital camera which uses an imager for imaging a photographic subject, said digital camera performing two dark exposure operations including a primary dark exposure operation and a secondary dark exposure operation, to obtain corresponding two dark output values for each picture element of the imager, in which the photographic subject is imaged, while the imager is shaded, after a normal exposure operation in which the photographic subject is imaged; calculating a representative value for each dark exposure operation, based on the two dark output values; calculating, for each dark exposure operation, a ratio of a representative value by dividing the representative value for the primary dark exposure operation by the representative value for the secondary dark exposure operation; calculating noise components caused by a dark current in each said picture element of the imager in said normal exposure operation on the basis of said ratio; and reducing said noise components from respective output values of each said picture element, produced in said normal exposure operation.

\* \* \* \* \*